Nov. 6, 1962     D. W. HARLING     3,062,952
JUNCTION BOX AND SUPPORT MEANS FOR LUMINAIRES
Filed Jan. 6, 1958     4 Sheets-Sheet 1

INVENTOR.
Donald W. Harling
BY
ATTORNEY

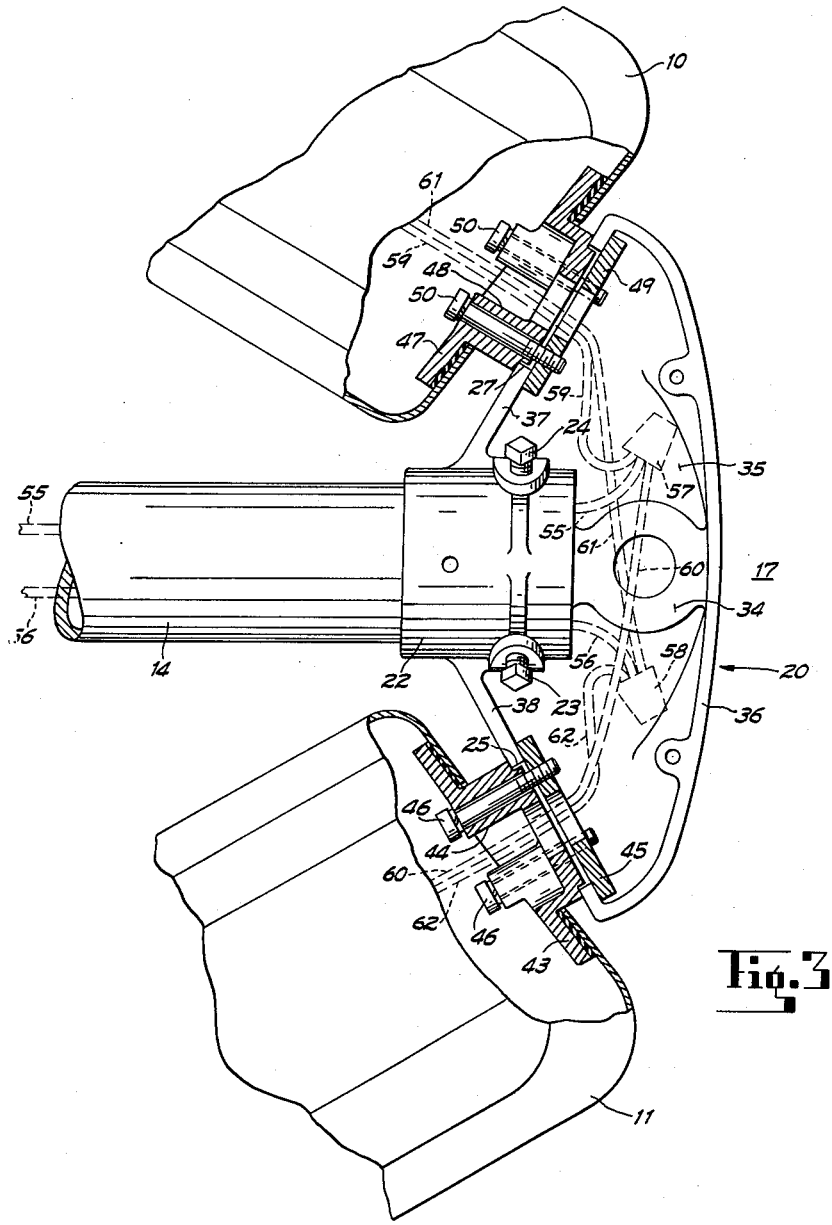

Nov. 6, 1962        D. W. HARLING        3,062,952
JUNCTION BOX AND SUPPORT MEANS FOR LUMINAIRES
Filed Jan. 6, 1958        4 Sheets-Sheet 3
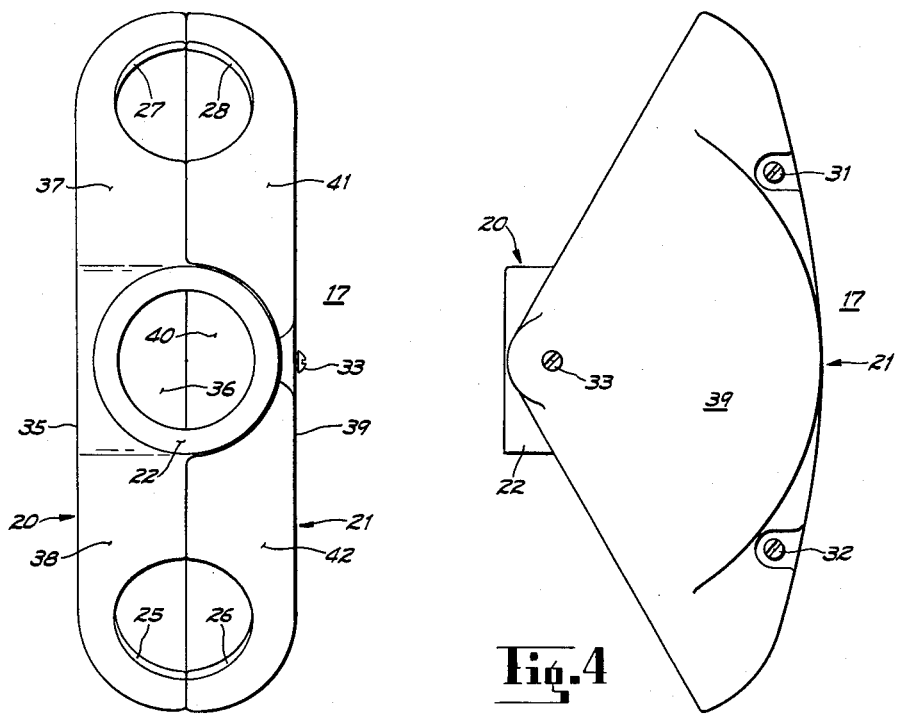
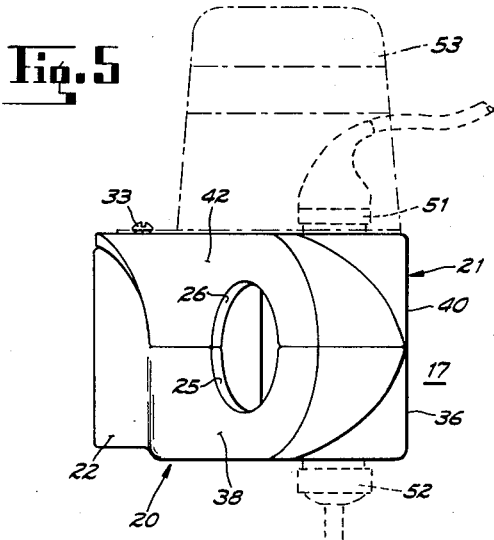
INVENTOR.
Donald W. Harling
BY
ATTORNEY Nov. 6, 1962 D. W. HARLING 3,062,952
JUNCTION BOX AND SUPPORT MEANS FOR LUMINAIRES
Filed Jan. 6, 1958 4 Sheets-Sheet 4

INVENTOR.
Donald W. Harling
BY
ATTORNEY

United States Patent Office 3,062,952
Patented Nov. 6, 1962

3,062,952
JUNCTION BOX AND SUPPORT MEANS
FOR LUMINAIRES
Donald W. Harling, Milwaukee, Wis., assignor to McGraw-Edison Company, Milwaukee, Wis., a corporation of Delaware
Filed Jan. 6, 1958, Ser. No. 707,302
6 Claims. (Cl. 240—25)

This invention pertains to an electrical wiring junction box for luminaires and, more particularly, to a combination electrical wiring junction box and support means for luminaires adapted for outdoor street lighting and the like.

Heretofore, in mounting a plurality of luminaires on a single pole, the wiring of each individual luminaire has been undertaken as an individual item. It is the object of this invention to provide an electrical wiring junction box which allows electrical connections to a plurality of luminaires to be easily and quickly accommodated therein.

It is a further object of this invention to provide a junction box which affords the dual function of providing a chamber for containing a plurality of electrical connections while simultaneously providing an adjustable support for a plurality of luminaires.

A further object of this invention is to provide a combination junction box and support means as aforestated which provides exceedingly easy access to the interior thereof for electrical attachment of a plurality of luminaires to a supply wire which emanates from underground wiring systems and the like.

It is another object of this invention to provide a combination junction box and support means which is particularly adaptable for a V-mounting of a plurality of elongated luminaires, such as fluorescent luminaires adapted for street lighting, said combination junction box and support means being located at the common end of the V-mounting luminaires.

Still another object of the invention as above characterized is to provide a junction box chamber which provides easy access for interwiring of at least two luminaires as aforementioned for part-night lighting wherein at a preselected period of time, a single light, in contradistinction to both lights, is left burning to thereby cut the cost of street lighting during periods when only a part of the light is needed.

Another object of this invention is to provide combination junction box and support means for luminaires as aforementioned wherein a bearing type friction lock is provided for selective rotatable mounting of said luminaires, said box also protecting the interconnecting wires from the weather or the like.

It is a further object of this invention to provide a combination junction box and support means as above described which provides an easy entrance for overhead wiring systems, can accommodate photoelectric controls mounted directly thereon, can easily accommodate outlets for festoon lighting, is easy to manufacture, has high manufacturing tolerances, is easy to assemble, ship, pack and store, and is otherwise well adapted for the purposes for which it was designed.

The novel features that are characteristic of the invention are set forth with particularly in the appended claims. The invention itself, both as to its organization and its method of operation, together with additional objects and advanages thereof, will best be understood by the following description of a specific embodiment when read in connection with the accompanying drawings in which:

FIG. 3 is an enlarged fragmentary view, partly in section and a portion removed showing the interior of the combination junction box and supporting means illustrated in FIG. 1;

FIG. 4 is a plan view of the combination junction box and supporting means disassociated from other portions of the assembly;

FIG. 5 is a view of the junction box and support means as seen from the left relative to FIG. 4;

FIG. 6 is a front elevational view of the combination junction box and supporting means as seen from the bottom relative to FIG. 4, the dotted lines and the dot-dash lines indicating the respective positions of various attachments to said junction box and support means;

Figure 1:
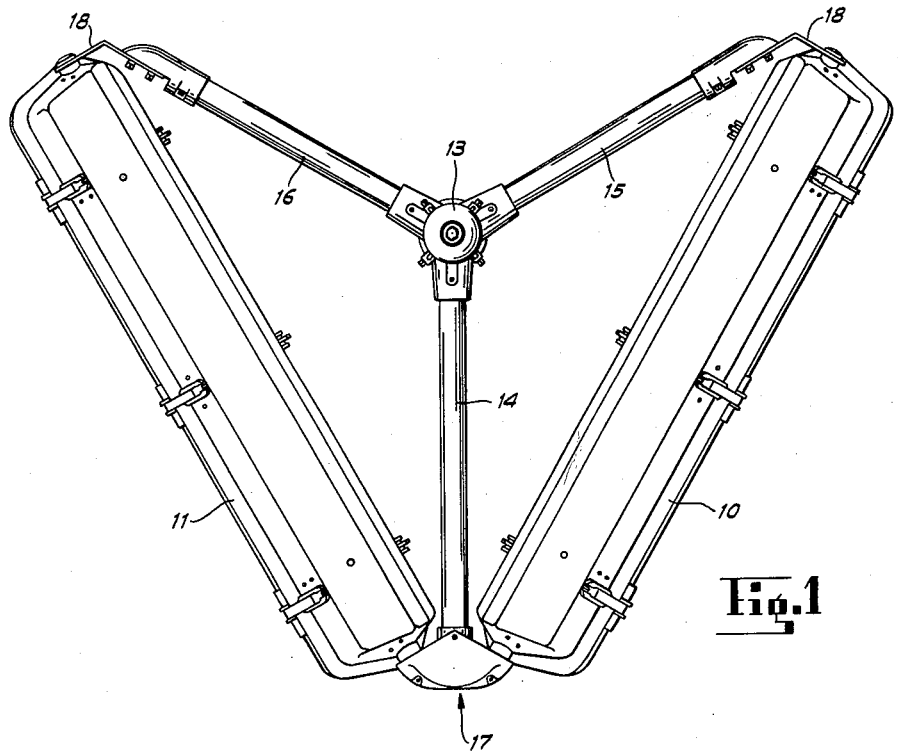
FIG. 1 is a plan assembly view of pole mounted elongated luminaires, one end of each of said luminaires being supported by the novel combination junction box and support means.
Figure 2:
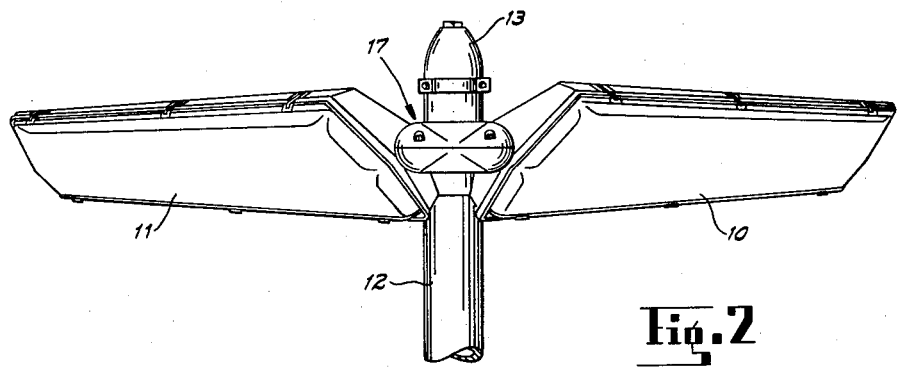
FIG. 2 is a fragmentary front elevational view of the assembly of luminaires and junction box shown in FIG. 1.

Returning now to FIGS. 1, 2 and 3, a plurality of luminaires 10 and 11 may be mounted on a pole 12 by Y-shaped assembly of tubular support members 14, 15 and 16 which are fastened at their inner common ends to a Y-shaped mounting bracket 13, the latter being directly mounted on the top of the pole 12. The tubular support members 15 and 16, respectively, have mounted at their outer ends an offset type end supporting straps 18 and 19 for accommodation of the free ends of the V-mounted luminaires 10 and 11. The straps 18 and 19 are apertured so as to admit cooperating lugs extending from the respective luminaires 10 and 11 to elevationally support the latter while permitting relative rotational movement thereof. The tubular support member 14 is common to corresponding adjacent ends of each of the luminaires 10 and 11 and has a combination junction box and support means 17 mounted at the outer end thereof for receipt of an electrical supply line which is interior of the pole 12 and the tubular support member 14. Therefore Y-shaped support means, including support members 14, 15, and 16, is provided for mounting the luminaires 10 and 11 in their normal operating position.

Viewing FIGS. 3 through 8, the combination junction box and support means 17 may comprise a base portion 20 and a cover portion 21. The base portion is shown with a tubular mounting portion 22 adapted to circumferentially surround the end of the tubular conduit or support 14 and held in intimate fixed engagement therewith by set screws 23 and 24. It will be apparent that the base 20 may be rotated about portion 22 for adjustable levelment with respect to the tubular support member 14 and then locked in place by way of the set screws 23 and 24.

Figure 7:
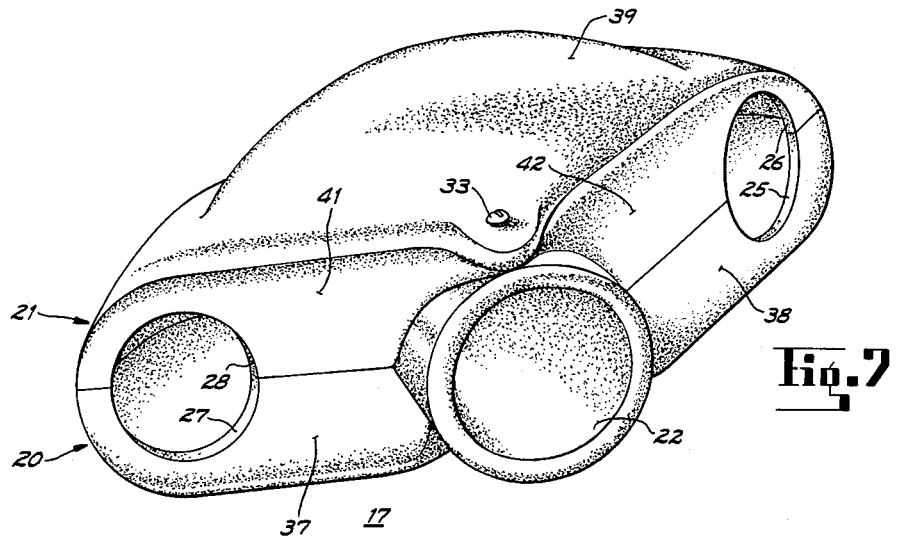
FIG. 7 is a perspective view of the base and cover which comprise the combination junction box and support means.
Figure 8:
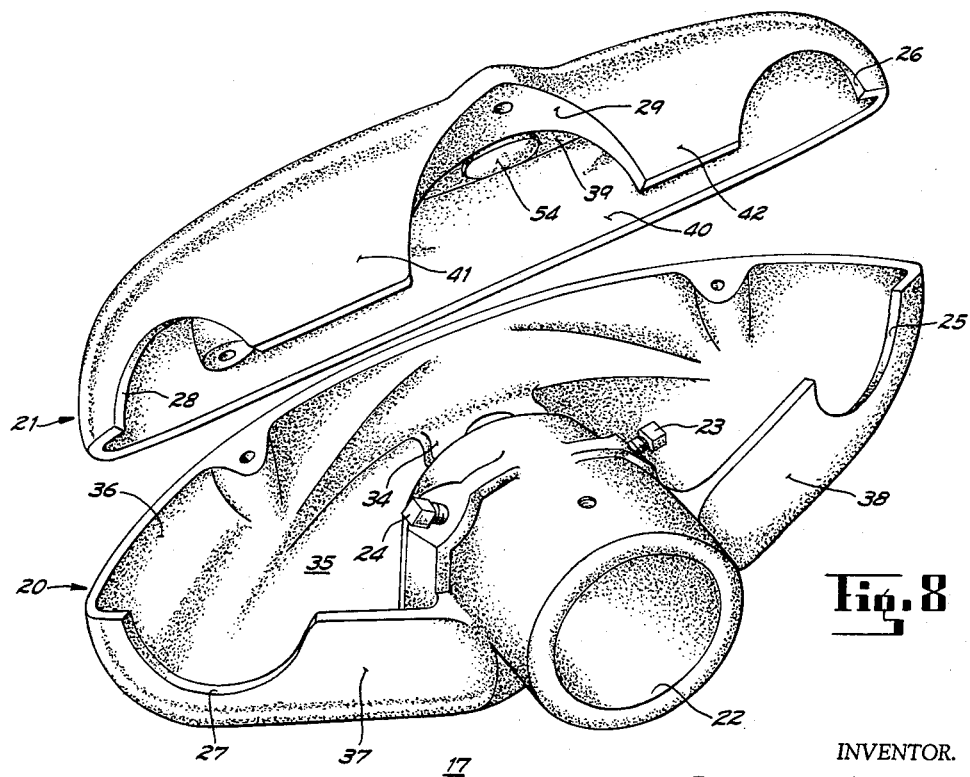
FIG. 8 is an exploded perspective view of the base and cover of the combination junction box and support means.

The base portion 20 and the cover portion 21 are matingly cooperable one to the other and are each formed with opposing semi-circular slots 25, 26. 27 and 28 which, when the base and cover are assembled, form the circular apertures shown in FIGS. 5 and 7. It will be observed that two apertures formed by the semi-circular slots 25 through 28 in their respective cover and base portions and the aperture in the tubular mounting means 22 are in alignment one with the other. The cover 21 is formed with a third semi-circular aperture 29 which is adapted to surround the outside of the mounting means 22 on the base 20. The cover 21 may be mounted upon the base 20 by a plurality of screws 31, 32 and 33 which are best shown in FIG. 4 of the drawing.

More particularly described, the cover 21 has a top wall portion 39, a curvilinear back wall portion 40 and slanting sidewall portions 41 and 42. The semicircular aperture 28 is formed in the sidewall portion 41 and the semicircular slot or aperture 26 is formed in the sidewall 42, the aperture 29 for accommodating the pipe-like mounting means 22 being formed at the confluence of the sidewalls 41 and 42. The inside of the topwall portion 39 is provided with excess material centrally thereof near the backwall to provide a strengthened wall portion for a service entrance. This excess material portion is denominated with the reference numeral 54.

Returning now to the base portion 20, it is formed with a bottom wall portion 35, a curvilinear back wall portion 36 and angularly disposed sidewall portions 37 and 38 which are joined to the outside of the tubular mounting means 22. The semi-circular aperture 27 is formed in the sidewall 37, and the semi-circular aperture 25 is formed in the sidewall 38. The inside bottom wall portion 35 is provided with excess material at 34 near the back wall 36 and centrally thereof to provide excess stock for strengthening the area surrounding a suitable aperture for an outside entrance to the junction box 17 if such an entrance is desired.

Hub means is provided at the common end of each of the V-mounted luminaires 10 and 11 for mounting said luminaires to the junction box and supporting means 17 as best shown in FIG. 3. The hub means for mounting the luminaire 11 comprises an annular hub member 43 having a wide peripheral flange for engaging the interior end wall of the luminaire and a washer member 45 which may be clamped to member 43 by suitable mounting bolts 46. The hub member 43 is formed with an extending portion that is adapted to fit within aperture 25—26 and a shoulder which engages the outer surface surrounding the semi-circular aperture 25—26. The washer 45 is adapted to frictionally and clampingly engage the inner surface of wall 38 of a base 20 and wall 42 of cover 21. By loosening the bolts 46 and simply rotatably twisting the luminaire 11 relative to the junction box 17, rotational adjustment of the luminaire 11 may be had. It is apparent that the bolts may then be tightened to fix the luminaire in place. It will be observed that the hub member 43 has a large bore 44 to provide an egress for conductors from the junction box chamber to the interior of the luminaire 11.

It should be noted that the hub means, including the hub member 43 and fastening means (washer 45 and bolts 46), is disposed, with relation to the junction box 17, in proximity to the apertures formed by slots 25—26 and 27—28 with no part thereof extending into or over the hollow junction box chamber. Therefore, the hollow chamber is free of obstructions and ready access may be had to the electrical conductors disposed therein by merely removing the cover member 39.

The luminaire 10 is mounted to the walls near apertures 27 and 28 of junction box 17 by a hub member 47, washer 49, and mounting bolts 50, there being an aperture or bore 48 in the hub member 47 to egress for the electrical supply conductors in the junction box chamber. These parts 47 to 50 operate identically with the aforedescribed parts 43–46, inclusive.

The electrical supply conductors are shown in dotted lines in FIG. 3, the supply conductors 55 and 56 being attached at one end to a suitable source (not shown) and disposed within the tubular conductor 14 for entry into the junction box 17. The conductor 55 is electrically connected to conductors 59 and 60 at 57, said conductors 59 and 60 extending through bores 48 and 44 of hubs 47 and 43 to the luminaires 10 and 11, respectively. The other side of the supply, i.e., conductor 56, is electrically connected to conductors 61 and 62 at 58 for extension through bores 48 and 44 in the respective hubs of luminaires 10 and 11 to complete the electrical circuit. It is apparent that the luminaires' electrical supply system may also be brought in through an aperture in the base or in the cover if desired.

As shown in FIG. 6 of the drawings, the combination junction box and support means 17 is adapted to have a connector 51 mounted thereon for original supply if desired or for festoon lighting purposes. The connector 51 is shown in dotted line, the position of the connector preferably being aligned with the strengthened portion 54 in the top wall portion 39 of the cover 21. The location of a bottom wall entrance and a connector 52 attached thereto is shown on the under side attached to the bottom wall portion 35 of the base 20 for connection through the excess metal portion 34 at the rear of the base.

The cover portion 21 is so configured as to easily receive a photoelectric control 53 as shown in dot and dash line. The control 53 may be easily mounted upon said top wall cover 21 of the junction box and held in place by mounting bolt 33. The photocontrol when placed as shown, affords independent control of the luminaires as suitable and desired.

Although specific embodiments of the invention have been shown and described, it is with full awareness that many modifications thereof are possible. The invention, therefore, is not to be restricted except insofar as is necessitated by the prior art and by the spirit of the appended claims.

What is claimed as the invention is:

1. In combination a support member having electrical conductors disposed therein, a junction box including a base member and a detachable cover member cooperating to form a hollow chamber and including means for providing an entry to said chamber for said electrical conductors, said junction box further including mounting means and a plurality of generally circular apertures, said mounting means engaging said support member and releasably affixing said junction box thereto, a plurality of luminaires, and hub means fixed to one end of each of said luminaires and adjustably rotatably disposed in said apertures in said junction box for connecting said luminaires to said junction box, said support member including means for rotatably supporting the other ends of said luminaires so that said luminaires are mounted for rotation about a longitudinal axis.

2. In combination a support member having electrical conductors disposed therein, a junction box including a base member and a detachable cover member cooperating to form a hollow chamber, said base member including integral mounting means engaging said support member and releasably affixing said junction box thereto, said mounting means having an aperture for permitting the entry to said chamber of said electrical conductors, said base member and said cover member each having a plurality of mating generally semi-circular slots cooperating to form a plurality of generally circular apertures in said junction box, a plurality of luminaires, and hub means connecting each of said luminaires to said junction box, each of said hub means including a first portion fixed to an end of each said luminaires and disposed in said apertures in said junction box and fastening means releasably engaging the inner surface of said junction box and operatively associated with said first portion for adjustably mounting said luminaires in a plurality of angular positions relative to said junction box, said fastening means being disposed in proximity to said apertures whereby said hollow chamber is generally free of obstructions to permit ready access to said electrical conductors by removing said cover member for wiring said luminaires, said support member also including means for rotatably supporting the other ends of said luminaires so that said luminaires are mounted for rotation about their longitudinal axis.

3. In combination a support member having electrical conductors disposed therein, a junction box including a base member and a detachable cover member cooperating to form a hollow chamber, said base member including integral mounting means engaging said support member and releasably affixing said junction box thereto, said mounting means having an aperture form therein for providing an entry to said chamber for said electrical conductors, said base member and said cover member each having a plurality of mating generally semi-circular slots cooperating to form a plurality of generally circular aperatures in said junction box, a plurality of luminaires, and hub means fixed to an end of each of said luminaires and adjustably rotatably disposed in said apertures in said junction box for connecting said luminaires to said junction box, said support means also adjustably connected to the other end of said luminaire so that said luminaires are mounted for rotation about a longitudinal axis.

4. In combination, a junction box having a base member and a detachable cover member cooperating to form a hollow chamber, said base member and said cover member each having a plurality of mating semi-circular slots cooperating to form a plurality of generally circular apertures in said junction box, a plurality of elongated luminaires, first means for supporting said junction box and including electrical conductors extending into said junction box, said first means also supporting one end of each of said luminaires for relatively rotational movement, and hub means attached to the other end of each of said luminaires for rotatably connecting said luminaires to said junction box said first means and said hub means supporting each luminaire for rotation about a longitudinal axis, each of said hub means including a first portion fixed to an end of each of said luminaires and disposed in respective ones of said apertures in said junction box and a second portion engaging the inner surface of said junction box and operatively associated with said first portion for adjustably rotatably mounting said luminaires on said junction box, said second portion being disposed in proximity to said apertures whereby said hollow chamber is generally free of obstructions to permit ready access to said electrical conductors by removing said cover member for wiring said luminaires.

5. In combination, a junction box having a base member and a detachable cover member cooperating to form a hollow chamber, said junction box including a plurality of generally circular apertures, a plurality of elongated luminaires, means for supporting said junction box and including electrical conductors extending into said hollow chamber, said support means further engaging one end of each of said luminaires for supporting said luminaires for rotation about said point of engagement of said support means with said luminaires, and hub means attached to the other end of each of said luminaires and rotatably engaging said apertures and extending into said chamber for adjustably connecting said luminaires to said junction box, said hub means jointly with said points of engagement of said support means and said luminaires defining an axis of rotation through each of said luminaires, the portion of said hub means within said chamber being in close proximity to said apertures whereby said hollow chamber is generally free of obstructions to permit ready access to said electrical conductors by removing said cover member for wiring said luminaires.

6. In combination a junction box having a base member and detachable cover member cooperating to form a hollow chamber, a plurality of luminaires each being rotatably supported at one end and having hub means connected to the opposite ends thereof, said hub means rotatably engaging said junction box for connecting said luminaires to said junction box, whereby said luminaires are each rotatable about an axis defined by said hub means and said points at which said other ends of each of said luminaires are supported, and means for admitting electrical conductors within said junction box.

References Cited in the file of this patent

UNITED STATES PATENTS

| | | |
|---|---|---|
| 1,366,093 | Noe | Jan. 18, 1921 |
| 1,736,779 | Despard | Nov. 26, 1929 |
| 2,170,882 | Wideroe | Aug. 29, 1939 |
| 2,307,247 | Tuck | Jan. 5, 1943 |
| 2,420,190 | Pieper | May 6, 1947 |
| 2,562,064 | Rutledge | July 24, 1951 |
| 2,717,954 | Rex | Sept. 13, 1955 |
| 2,769,898 | Popp | Nov. 6, 1956 |